(12) United States Patent
Beck et al.

(10) Patent No.: US 8,182,687 B2
(45) Date of Patent: May 22, 2012

(54) METHODS OF MINIMISING THE EFFECT OF INTEGRITY LOSS IN HOLLOW FIBRE MEMBRANE MODULES

(75) Inventors: Thomas William Beck, North Richmond (AU); Warren Thomas Johnson, Grose Vale (AU)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/022,940

(22) Filed: Jan. 30, 2008

(65) Prior Publication Data

US 2008/0179249 A1    Jul. 31, 2008

Related U.S. Application Data

(63) Continuation of application No. 11/496,378, filed on Jul. 31, 2006, now Pat. No. 7,344,645, which is a continuation of application No. 11/015,655, filed on Dec. 16, 2004, now Pat. No. 7,160,463, which is a continuation of application No. PCT/AU03/00755, filed on Jun. 17, 2003.

(30) Foreign Application Priority Data

Jun. 18, 2002    (AU) .......................................... PS3006

(51) Int. Cl.
*B01D 63/00* (2006.01)
*B01D 61/00* (2006.01)
*B29C 73/00* (2006.01)

(52) U.S. Cl. ................ 210/321.8; 210/650; 210/500.23; 264/36.1

(58) Field of Classification Search ............. 210/500.23, 210/321.78–321.81, 321.87–321.9; 264/40.6, 264/255, 263, 277, 36.1
See application file for complete search history.

(56) References Cited

U.S. PATENT DOCUMENTS

| | | |
|---|---|---|
| 256,008 A | 4/1882 | Leak |
| 285,321 A | 9/1883 | Tams |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |

(Continued)

FOREIGN PATENT DOCUMENTS

AU    34400/84    9/1983

(Continued)

OTHER PUBLICATIONS

Almulla et al., Desalination, 153 (2002), pp. 237-243.

(Continued)

*Primary Examiner* — Ana Fortuna

(57) ABSTRACT

A method and apparatus for reducing the effect of integrity loss in a hollow fiber membrane module, said module including a plurality of hollow fiber membranes (5), at least one end of the fiber membranes (5) being supported in a pot (6), the method including the step of increasing flow resistance of the liquid through the lumen (8) of the fiber membrane (5) in the region of the pot (6).

4 Claims, 3 Drawing Sheets

U.S. PATENT DOCUMENTS

| | | | |
|---|---|---|---|
| 3,228,876 A | 1/1966 | Mahon | |
| 3,275,554 A | 9/1966 | Wagenaar | |
| 3,442,002 A | 5/1969 | Geary et al. | |
| 3,462,362 A | 8/1969 | Kollsman | |
| 3,472,765 A | 10/1969 | Budd et al. | |
| 3,492,698 A | 2/1970 | Geary et al. | |
| 3,501,798 A | 3/1970 | Carraro | |
| 3,505,215 A | 4/1970 | Bray | |
| 3,556,305 A | 1/1971 | Shorr | |
| 3,591,010 A | 7/1971 | Pall et al. | |
| 3,625,827 A | 12/1971 | Wildi et al. | |
| 3,654,147 A | 4/1972 | Levin et al. | |
| 3,679,052 A | 7/1972 | Asper | |
| 3,693,406 A | 9/1972 | Tobin, III | |
| 3,700,561 A | 10/1972 | Ziffer | |
| 3,700,591 A | 10/1972 | Higley | |
| 3,708,071 A | 1/1973 | Crowley | |
| 3,728,256 A | 4/1973 | Cooper | |
| 3,763,055 A | 10/1973 | White et al. | |
| 3,791,631 A | 2/1974 | Meyer | |
| 3,795,609 A | 3/1974 | Hill et al. | |
| 3,804,258 A | 4/1974 | Okuniewski et al. | |
| 3,843,809 A | 10/1974 | Luck | |
| 3,876,738 A | 4/1975 | Marinaccio et al. | |
| 3,955,998 A | 5/1976 | Clampitt et al. | |
| 3,968,192 A | 7/1976 | Hoffman, III et al. | |
| 3,992,301 A | 11/1976 | Shippey et al. | |
| 3,993,816 A | 11/1976 | Baudet et al. | |
| 4,049,765 A | 9/1977 | Yamazaki | |
| 4,076,656 A | 2/1978 | White et al. | |
| 4,082,683 A | 4/1978 | Galesloot | |
| 4,105,556 A | 8/1978 | O'Amaddio et al. | |
| 4,105,731 A | 8/1978 | Yamazaki | |
| 4,107,043 A | 8/1978 | McKinney | |
| 4,138,460 A | 2/1979 | Tigner | |
| 4,157,899 A | 6/1979 | Wheaton | |
| 4,183,890 A | 1/1980 | Bollinger | |
| 4,188,817 A | 2/1980 | Steigelmann | |
| 4,190,411 A | 2/1980 | Fujimoto | |
| 4,190,419 A * | 2/1980 | Bauer | 436/97 |
| 4,192,750 A | 3/1980 | Elfes et al. | |
| 4,193,780 A | 3/1980 | Cotton, Jr. et al. | |
| 4,203,848 A | 5/1980 | Grandine, II | |
| 4,204,961 A | 5/1980 | Cusato, Jr. | |
| 4,218,324 A | 8/1980 | Hartmann et al. | |
| 4,226,921 A | 10/1980 | Tsang | |
| 4,227,295 A | 10/1980 | Bodnar et al. | |
| 4,230,583 A | 10/1980 | Chiolle et al. | |
| 4,243,525 A | 1/1981 | Greenberg | |
| 4,247,498 A | 1/1981 | Castro | |
| 4,248,648 A | 2/1981 | Kopp | |
| 4,253,936 A | 3/1981 | Leysen et al. | |
| 4,271,026 A | 6/1981 | Chen et al. | |
| 4,302,336 A | 11/1981 | Kawaguchi et al. | |
| 4,315,819 A * | 2/1982 | King et al. | 210/321.8 |
| 4,323,453 A * | 4/1982 | Zampini | 210/321.61 |
| 4,340,479 A | 7/1982 | Pall | |
| 4,350,592 A | 9/1982 | Kronsbein | |
| 4,353,802 A | 10/1982 | Hara et al. | |
| 4,359,359 A | 11/1982 | Gerlach et al. | |
| 4,367,139 A * | 1/1983 | Graham | 210/321.9 |
| 4,367,140 A | 1/1983 | Wilson | |
| 4,369,605 A | 1/1983 | Opersteny et al. | |
| 4,384,474 A | 5/1983 | Kowalski | |
| 4,385,150 A | 5/1983 | Miyake et al. | |
| 4,388,189 A | 6/1983 | Kawaguchi et al. | |
| 4,389,363 A | 6/1983 | Molthop | |
| 4,405,688 A * | 9/1983 | Lowery et al. | 96/10 |
| 4,407,975 A | 10/1983 | Yamaguchi | |
| 4,414,113 A | 11/1983 | LaTerra | |
| 4,414,172 A | 11/1983 | Leason | |
| 4,415,452 A | 11/1983 | Heil et al. | |
| 4,431,545 A | 2/1984 | Pall et al. | |
| 4,451,369 A | 5/1984 | Sekino et al. | |
| 4,462,855 A | 7/1984 | Yankowsky et al. | |
| 4,467,001 A * | 8/1984 | Coplan et al. | 427/434.6 |
| 4,476,015 A | 10/1984 | Schmitt et al. | |
| 4,476,112 A | 10/1984 | Aversano | |
| 4,491,522 A | 1/1985 | Ishida et al. | |
| 4,496,470 A | 1/1985 | Kapiloff et al. | |
| 4,511,471 A | 4/1985 | Müller | |
| 4,519,909 A | 5/1985 | Castro | |
| 4,539,940 A | 9/1985 | Young | |
| 4,540,490 A | 9/1985 | Shibata et al. | |
| 4,547,289 A | 10/1985 | Okano et al. | |
| 4,609,465 A | 9/1986 | Miller | |
| 4,610,789 A | 9/1986 | Barch | |
| 4,614,109 A | 9/1986 | Hofmann | |
| 4,623,460 A * | 11/1986 | Kuzumoto et al. | 210/321.87 |
| 4,623,670 A | 11/1986 | Mutoh et al. | |
| 4,629,563 A | 12/1986 | Wrasidlo | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis, III | |
| 4,650,596 A | 3/1987 | Schlueter et al. | |
| 4,656,865 A | 4/1987 | Callan | |
| 4,660,411 A | 4/1987 | Reid | |
| 4,666,543 A | 5/1987 | Kawano | |
| 4,670,145 A | 6/1987 | Edwards | |
| 4,673,507 A | 6/1987 | Brown | |
| 4,687,561 A | 8/1987 | Kunz | |
| 4,687,578 A | 8/1987 | Stookey | |
| 4,688,511 A | 8/1987 | Gerlach et al. | |
| 4,689,191 A | 8/1987 | Beck et al. | |
| 4,702,836 A | 10/1987 | Mutoh et al. | |
| 4,702,840 A | 10/1987 | Degen et al. | |
| 4,707,266 A | 11/1987 | Degen et al. | |
| 4,708,799 A | 11/1987 | Gerlach et al. | |
| 4,718,270 A | 1/1988 | Storr | |
| 4,744,240 A | 5/1988 | Reichelt | |
| 4,749,487 A | 6/1988 | Lefebvre | |
| 4,756,875 A | 7/1988 | Tajima et al. | |
| 4,763,612 A | 8/1988 | Iwanami | |
| 4,767,539 A | 8/1988 | Ford | |
| 4,774,132 A | 9/1988 | Joffee et al. | |
| 4,775,471 A | 10/1988 | Nagai et al. | |
| 4,779,448 A | 10/1988 | Gogins | |
| 4,781,831 A | 11/1988 | Goldsmith | |
| 4,784,771 A | 11/1988 | Wathen et al. | |
| 4,793,932 A | 12/1988 | Ford et al. | |
| 4,797,187 A | 1/1989 | Davis et al. | |
| 4,797,211 A | 1/1989 | Ehrfeld et al. | |
| 4,800,019 A * | 1/1989 | Bikson et al. | 210/321.8 |
| 4,810,384 A | 3/1989 | Fabre | |
| 4,812,235 A | 3/1989 | Seleman et al. | |
| 4,816,160 A | 3/1989 | Ford et al. | |
| 4,824,563 A | 4/1989 | Iwahori et al. | |
| 4,834,998 A | 5/1989 | Shrikhande | |
| 4,839,048 A | 6/1989 | Reed et al. | |
| 4,840,227 A | 6/1989 | Schmidt | |
| 4,846,970 A | 7/1989 | Bertelsen et al. | |
| 4,867,883 A | 9/1989 | Daigger et al. | |
| 4,876,006 A | 10/1989 | Ohkubo et al. | |
| 4,876,012 A | 10/1989 | Kopp et al. | |
| 4,886,601 A | 12/1989 | Iwatsuka et al. | |
| 4,888,115 A | 12/1989 | Marinaccio et al. | |
| 4,904,426 A | 2/1990 | Lundgard et al. | |
| 4,919,815 A | 4/1990 | Copa et al. | |
| 4,921,610 A | 5/1990 | Ford et al. | |
| 4,931,186 A | 6/1990 | Ford et al. | |
| 4,933,084 A | 6/1990 | Bandel et al. | |
| 4,935,143 A | 6/1990 | Kopp et al. | |
| 4,952,317 A | 8/1990 | Culkin | |
| 4,963,304 A | 10/1990 | Im et al. | |
| 4,966,699 A * | 10/1990 | Sasaki et al. | 210/321.8 |
| 4,968,430 A | 11/1990 | Hildenbrand et al. | |
| 4,968,733 A | 11/1990 | Muller et al. | |
| 4,969,997 A | 11/1990 | Klüver et al. | |
| 4,988,444 A | 1/1991 | Applegate et al. | |
| 4,999,038 A | 3/1991 | Lundberg | |
| 5,002,666 A | 3/1991 | Matsumoto et al. | |
| 5,005,430 A | 4/1991 | Kibler et al. | |
| 5,015,275 A | 5/1991 | Beck et al. | |
| 5,024,762 A | 6/1991 | Ford et al. | |
| 5,034,125 A | 7/1991 | Karbachsch et al. | |

| Patent No. | Date | Name |
|---|---|---|
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Müller et al. |
| 5,066,402 A | 11/1991 | Anselme et al. |
| 5,069,065 A | 12/1991 | Sprunt et al. |
| 5,069,353 A | 12/1991 | Espenan |
| 5,075,065 A | 12/1991 | Effenberger et al. |
| 5,076,925 A | 12/1991 | Roesink et al. |
| 5,079,272 A | 1/1992 | Allegrezza et al. |
| 5,094,750 A | 3/1992 | Kopp et al. |
| 5,094,867 A | 3/1992 | Detering et al. |
| 5,098,567 A | 3/1992 | Nishiguchi |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A * | 10/1994 | Seita et al. ............... 210/500.23 |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | Loker |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| D396,726 S | 8/1998 | Sadr et al. |
| D400,890 S | 11/1998 | Gambardella |
| 5,843,069 A | 12/1998 | Butler et al. |
| 5,846,424 A | 12/1998 | Khudenko |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A * | 12/1999 | Espenan et al. ............... 210/636 |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Côté et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |

| Patent No. | Date | Inventor(s) | Patent No. | Date | Inventor(s) |
|---|---|---|---|---|---|
| 6,280,626 B1 | 8/2001 | Miyashita et al. | 6,863,817 B2 | 3/2005 | Liu et al. |
| 6,284,135 B1 | 9/2001 | Ookata | 6,863,818 B2 | 3/2005 | Daigger et al. |
| 6,290,756 B1 | 9/2001 | Macheras et al. | 6,863,823 B2 | 3/2005 | Côté |
| 6,294,039 B1 | 9/2001 | Mahendran et al. | 6,869,534 B2 | 3/2005 | McDowell et al. |
| 6,299,773 B1 | 10/2001 | Takamura et al. | 6,872,305 B2 | 3/2005 | Johnson et al. |
| 6,303,026 B1 | 10/2001 | Lindbo | 6,881,343 B2 | 4/2005 | Rabie et al. |
| 6,303,035 B1 | 10/2001 | Cote et al. | 6,884,350 B2 | 4/2005 | Muller |
| 6,315,895 B1 | 11/2001 | Summerton et al. | 6,884,375 B2 | 4/2005 | Wang et al. |
| 6,319,411 B1 | 11/2001 | Cote | 6,890,435 B2 | 5/2005 | Ji et al. |
| 6,322,703 B1 | 11/2001 | Taniguchi et al. | 6,890,645 B2 | 5/2005 | Disse et al. |
| 6,324,898 B1 * | 12/2001 | Cote et al. ............... 73/38 | 6,893,568 B1 | 5/2005 | Janson et al. |
| 6,325,928 B1 | 12/2001 | Pedersen et al. | 6,899,812 B2 | 5/2005 | Cote et al. |
| 6,325,938 B1 | 12/2001 | Miyashita et al. | 6,946,073 B2 | 9/2005 | Daigger et al. |
| 6,331,248 B1 | 12/2001 | Taniguchi et al. | 6,952,258 B2 | 10/2005 | Ebert et al. |
| 6,337,018 B1 | 1/2002 | Mickols | 6,955,762 B2 | 10/2005 | Gallagher et al. |
| RE37,549 E | 2/2002 | Mahendran et al. | 6,962,258 B2 | 11/2005 | Zha et al. |
| 6,349,835 B1 | 2/2002 | Saux et al. | 6,964,741 B2 | 11/2005 | Mahendran et al. |
| 6,354,444 B1 | 3/2002 | Mahendran | 6,969,465 B2 | 11/2005 | Zha et al. |
| 6,361,695 B1 | 3/2002 | Husain et al. | 6,974,554 B2 | 12/2005 | Cox et al. |
| 6,368,819 B1 | 4/2002 | Gaddy et al. | 6,994,867 B1 | 2/2006 | Hossainy et al. |
| 6,372,138 B1 | 4/2002 | Cho et al. | 7,005,100 B2 | 2/2006 | Lowel |
| 6,375,848 B1 | 4/2002 | Cote et al. | 7,014,763 B2 | 3/2006 | Johnson et al. |
| 6,383,369 B2 | 5/2002 | Elston | 7,018,530 B2 | 3/2006 | Pollock |
| 6,387,189 B1 | 5/2002 | Gröschl et al. | 7,018,533 B2 | 3/2006 | Johnson et al. |
| 6,402,955 B2 | 6/2002 | Ookata | 7,022,233 B2 | 4/2006 | Chen |
| 6,406,629 B1 | 6/2002 | Husain et al. | 7,041,728 B2 | 5/2006 | Zipplies et al. |
| 6,423,214 B1 | 7/2002 | Lindbo | 7,052,610 B2 | 5/2006 | Janson et al. |
| 6,423,784 B1 | 7/2002 | Hamrock et al. | 7,083,733 B2 | 8/2006 | Freydina et al. |
| 6,432,310 B1 | 8/2002 | Andou et al. | 7,087,173 B2 | 8/2006 | Cote et al. |
| 6,440,303 B2 | 8/2002 | Spriegel | 7,122,121 B1 | 10/2006 | Ji |
| D462,699 S | 9/2002 | Johnson et al. | 7,147,777 B1 | 12/2006 | Porteous |
| 6,444,124 B1 | 9/2002 | Onyeche et al. | 7,147,778 B1 | 12/2006 | DiMassimo et al. |
| 6,468,430 B1 | 10/2002 | Kimura et al. | 7,160,455 B2 | 1/2007 | Taniguchi et al. |
| 6,471,869 B1 | 10/2002 | Yanou et al. | 7,160,463 B2 * | 1/2007 | Beck et al. ............... 210/650 |
| 6,485,645 B1 | 11/2002 | Husain et al. | 7,160,464 B2 * | 1/2007 | Lee et al. ............... 210/651 |
| 6,495,041 B2 | 12/2002 | Taniguchi et al. | 7,172,699 B1 | 2/2007 | Trivedi et al. |
| 6,517,723 B1 | 2/2003 | Daigger et al. | 7,172,701 B2 | 2/2007 | Gaid et al. |
| 6,524,481 B2 | 2/2003 | Zha et al. | 7,186,344 B2 | 3/2007 | Hughes |
| 6,524,733 B1 | 2/2003 | Nonobe | 7,208,091 B2 | 4/2007 | Pind et al. |
| 6,550,747 B2 | 4/2003 | Rabie et al. | 7,223,340 B2 | 5/2007 | Zha et al. |
| 6,555,005 B1 | 4/2003 | Zha et al. | 7,226,541 B2 | 6/2007 | Muller et al. |
| 6,562,237 B1 | 5/2003 | Olaopa | 7,247,238 B2 | 7/2007 | Mullette et al. |
| 6,576,136 B1 | 6/2003 | De Moel et al. | 7,264,716 B2 | 9/2007 | Johnson et al. |
| 6,592,762 B2 | 7/2003 | Smith | 7,279,100 B2 | 10/2007 | Devine |
| D478,913 S | 8/2003 | Johnson et al. | 7,300,022 B2 | 11/2007 | Muller |
| 6,613,222 B2 | 9/2003 | Mikkelson et al. | 7,314,563 B2 | 1/2008 | Cho et al. |
| 6,620,319 B2 | 9/2003 | Behmann et al. | 7,329,344 B2 | 2/2008 | Jordan et al. |
| 6,627,082 B2 | 9/2003 | Del Vecchio et al. | 7,344,645 B2 * | 3/2008 | Beck et al. ............... 210/650 |
| 6,632,358 B1 | 10/2003 | Suga et al. | 7,361,274 B2 | 4/2008 | Lazaredes |
| 6,635,179 B1 | 10/2003 | Summerton et al. | 7,378,024 B2 | 5/2008 | Bartels et al. |
| 6,641,733 B2 | 11/2003 | Zha et al. | 7,387,723 B2 | 6/2008 | Jordan |
| 6,645,374 B2 | 11/2003 | Cote et al. | 7,404,896 B2 | 7/2008 | Muller |
| 6,656,356 B2 | 12/2003 | Gungerich et al. | 7,455,765 B2 | 11/2008 | Elefritz et al. |
| 6,682,652 B2 | 1/2004 | Mahendran et al. | 7,481,933 B2 | 1/2009 | Barnes |
| 6,685,832 B2 | 2/2004 | Mahendran et al. | 7,510,655 B2 | 3/2009 | Barnes |
| 6,696,465 B2 | 2/2004 | Dellaria et al. | 7,531,042 B2 | 5/2009 | Murkute et al. |
| 6,702,561 B2 | 3/2004 | Stillig et al. | 7,563,363 B2 | 7/2009 | Kuzma |
| 6,706,185 B2 | 3/2004 | Goel et al. | 7,591,950 B2 | 9/2009 | Zha et al. |
| 6,706,189 B2 | 3/2004 | Rabie et al. | 7,632,439 B2 | 12/2009 | Mullette et al. |
| 6,708,957 B2 | 3/2004 | Cote et al. | 7,662,212 B2 | 2/2010 | Mullette et al. |
| 6,712,970 B1 | 3/2004 | Trivedi | 7,708,887 B2 | 5/2010 | Johnson et al. |
| 6,721,529 B2 | 4/2004 | Chen et al. | 7,713,413 B2 | 5/2010 | Barnes |
| 6,723,758 B2 | 4/2004 | Stone et al. | 7,718,057 B2 | 5/2010 | Jordan et al. |
| 6,727,305 B1 | 4/2004 | Pavez Aranguiz | 7,718,065 B2 | 5/2010 | Jordan |
| 6,743,362 B1 | 6/2004 | Porteous et al. | 7,722,769 B2 | 5/2010 | Jordan et al. |
| 6,755,970 B1 | 6/2004 | Knappe et al. | 7,761,826 B1 * | 7/2010 | Thanvantri et al. ........... 716/108 |
| 6,758,972 B2 | 7/2004 | Vriens et al. | 7,819,956 B2 | 10/2010 | Muller |
| 6,770,202 B1 | 8/2004 | Kidd et al. | 7,850,851 B2 | 12/2010 | Zha et al. |
| 6,780,466 B2 | 8/2004 | Grangeon et al. | 7,862,719 B2 | 1/2011 | McMahon et al. |
| 6,783,008 B2 | 8/2004 | Zha et al. | 7,931,463 B2 | 4/2011 | Cox et al. |
| 6,790,912 B2 | 9/2004 | Blong | 7,938,966 B2 | 5/2011 | Johnson |
| 6,805,806 B2 | 10/2004 | Arnaud | 2001/0047962 A1 | 12/2001 | Zha et al. |
| 6,808,629 B2 | 10/2004 | Wouters-Wasiak et al. | 2001/0052494 A1 | 12/2001 | Cote et al. |
| 6,811,696 B2 | 11/2004 | Wang et al. | 2002/0070157 A1 | 6/2002 | Yamada |
| 6,814,861 B2 | 11/2004 | Husain et al. | 2002/0117444 A1 | 8/2002 | Mikkelson et al. |
| 6,821,420 B2 | 11/2004 | Zha et al. | 2002/0148767 A1 | 10/2002 | Johnson et al. |
| 6,830,782 B2 | 12/2004 | Kanazawa | 2002/0153313 A1 | 10/2002 | Cote |
| 6,841,070 B2 | 1/2005 | Zha et al. | 2002/0185435 A1 | 12/2002 | Husain et al. |
| 6,861,466 B2 | 3/2005 | Dadalas et al. | 2002/0189999 A1 | 12/2002 | Espenan et al. |

| | | | | | | |
|---|---|---|---|---|---|---|
| 2002/0195390 | A1 | 12/2002 | Zha et al. | 2007/0170112 A1 | 7/2007 | Elefritz et al. |
| 2003/0038080 | A1 | 2/2003 | Vriens et al. | 2007/0181496 A1 | 8/2007 | Zuback |
| 2003/0042199 | A1 | 3/2003 | Smith | 2007/0227973 A1 | 10/2007 | Zha et al. |
| 2003/0056919 | A1 | 3/2003 | Beck | 2008/0053923 A1 | 3/2008 | Beck et al. |
| 2003/0057155 | A1 | 3/2003 | Husain et al. | 2008/0093297 A1 | 4/2008 | Gock et al. |
| 2003/0075495 | A1 | 4/2003 | Dannstrom et al. | 2008/0156745 A1 | 7/2008 | Zha et al. |
| 2003/0121855 | A1 | 7/2003 | Kopp | 2008/0190846 A1 | 8/2008 | Cox et al. |
| 2003/0127388 | A1 | 7/2003 | Ando et al. | 2008/0203017 A1 | 8/2008 | Zha et al. |
| 2003/0146153 | A1 | 8/2003 | Cote et al. | 2008/0257822 A1 | 10/2008 | Johnson |
| 2003/0150807 | A1 | 8/2003 | Bartels et al. | 2008/0277340 A1 | 11/2008 | Hong et al. |
| 2003/0159988 | A1 | 8/2003 | Daigger et al. | 2009/0001018 A1 | 1/2009 | Zha et al. |
| 2003/0178365 | A1 | 9/2003 | Zha et al. | 2009/0223895 A1 | 9/2009 | Zha et al. |
| 2003/0196955 | A1 | 10/2003 | Hughes | 2009/0255873 A1 | 10/2009 | Biltoft et al. |
| 2003/0226797 | A1 | 12/2003 | Phelps | 2010/0000941 A1 | 1/2010 | Muller |
| 2003/0234221 | A1 | 12/2003 | Johnson et al. | 2010/0025320 A1 | 2/2010 | Johnson |
| 2004/0007525 | A1 | 1/2004 | Rabie et al. | 2010/0051545 A1 | 3/2010 | Johnson et al. |
| 2004/0035770 | A1 | 2/2004 | Edwards et al. | 2010/0170847 A1 | 7/2010 | Zha et al. |
| 2004/0045893 | A1 | 3/2004 | Watanabe et al. | 2010/0300968 A1 | 12/2010 | Liu et al. |
| 2004/0050791 | A1 | 3/2004 | Herczeg | 2011/0056522 A1 | 3/2011 | Zauner et al. |
| 2004/0055974 | A1 | 3/2004 | Del Vecchio et al. | 2011/0100907 A1 | 5/2011 | Zha et al. |
| 2004/0084369 | A1 | 5/2004 | Zha et al. | 2011/0114557 A2 | 5/2011 | Johnson et al. |
| 2004/0112831 | A1 | 6/2004 | Rabie et al. | 2011/0127209 A1 | 6/2011 | Rogers et al. |
| 2004/0139992 | A1 | 7/2004 | Murkute et al. | 2011/0132826 A1 | 6/2011 | Muller et al. |
| 2004/0145076 | A1 | 7/2004 | Zha et al. | 2011/0139715 A1 | 6/2011 | Zha et al. |
| 2004/0154671 | A1 | 8/2004 | Martins et al. | 2011/0192783 A1 | 8/2011 | Cox et al. |
| 2004/0168978 | A1 | 9/2004 | Gray | | | |
| 2004/0168979 | A1 | 9/2004 | Zha et al. | FOREIGN PATENT DOCUMENTS | | |
| 2004/0173525 | A1 | 9/2004 | Hunniford et al. | AU | 55847/86 | 3/1985 |
| 2004/0178154 | A1 | 9/2004 | Zha et al. | AU | 77066/87 | 7/1986 |
| 2004/0188341 | A1 | 9/2004 | Zha et al. | AU | 762091 B2 | 6/2003 |
| 2004/0211726 | A1 | 10/2004 | Baig et al. | CN | 1050770 C | 1/1995 |
| 2004/0217053 | A1 | 11/2004 | Zha et al. | CN | 2204898 Y | 8/1995 |
| 2004/0222158 | A1 | 11/2004 | Husain et al. | CN | 2236049 Y | 9/1996 |
| 2004/0232076 | A1 | 11/2004 | Zha et al. | CN | 1159769 A | 9/1997 |
| 2004/0245174 | A1 | 12/2004 | Takayama et al. | CN | 1249698 A | 4/2000 |
| 2005/0006308 | A1 | 1/2005 | Cote et al. | CN | 1541757 A | 11/2004 |
| 2005/0023219 | A1 | 2/2005 | Kirker et al. | DE | 3904544 A1 | 8/1990 |
| 2005/0029185 | A1 | 2/2005 | Muller | DE | 4117281 A1 | 1/1992 |
| 2005/0029186 | A1 | 2/2005 | Muller | DE | 4113420 A1 | 10/1992 |
| 2005/0032982 | A1 | 2/2005 | Muller et al. | DE | 4117422 C1 | 11/1992 |
| 2005/0045557 | A1 | 3/2005 | Daigger et al. | DE | 19503060 A1 | 8/1996 |
| 2005/0061725 | A1 | 3/2005 | Liu et al. | DE | 29804927 U1 | 6/1998 |
| 2005/0077227 | A1 | 4/2005 | Kirker et al. | DE | 29906389 | 6/1999 |
| 2005/0098494 | A1 | 5/2005 | Mullette et al. | DE | 10209170 C1 | 8/2003 |
| 2005/0103722 | A1 | 5/2005 | Freydina et al. | EP | 012557 B1 | 2/1983 |
| 2005/0109692 | A1 | 5/2005 | Zha et al. | EP | 126714 A2 | 11/1984 |
| 2005/0115880 | A1 | 6/2005 | Pollock | EP | 050447 B1 | 10/1985 |
| 2005/0115899 | A1 | 6/2005 | Liu et al. | EP | 194735 A2 | 9/1986 |
| 2005/0126963 | A1 | 6/2005 | Phagoo et al. | EP | 250337 A1 | 12/1987 |
| 2005/0139538 | A1 | 6/2005 | Lazaredes | EP | 327025 A1 | 8/1989 |
| 2005/0184008 | A1 | 8/2005 | Schacht et al. | EP | 344633 A1 | 12/1989 |
| 2005/0194310 | A1 | 9/2005 | Liu et al. | EP | 090383 B1 | 5/1990 |
| 2005/0194315 | A1 | 9/2005 | Adams et al. | EP | 407900 A2 | 1/1991 |
| 2005/0258098 | A1 | 11/2005 | Vincent et al. | EP | 463627 A2 | 1/1992 |
| 2006/0000775 | A1 | 1/2006 | Zha et al. | EP | 0464321 A1 | 1/1992 |
| 2006/0021929 | A1 | 2/2006 | Mannheim et al. | EP | 492942 A2 | 7/1992 |
| 2006/0065596 | A1 | 3/2006 | Kent et al. | EP | 518250 B1 | 12/1992 |
| 2006/0081533 | A1 | 4/2006 | Khudenko | EP | 547575 A1 | 6/1993 |
| 2006/0131234 | A1 | 6/2006 | Zha et al. | EP | 280052 B1 | 7/1994 |
| 2006/0201876 | A1 | 9/2006 | Jordan | EP | 395133 B1 | 2/1995 |
| 2006/0201879 | A1 | 9/2006 | Den Boestert et al. | EP | 662341 A1 | 7/1995 |
| 2006/0249448 | A1 | 11/2006 | Fujishima et al. | EP | 492446 B1 | 11/1995 |
| 2006/0249449 | A1 | 11/2006 | Nakhla et al. | EP | 430082 B1 | 6/1996 |
| 2006/0261007 | A1 | 11/2006 | Zha et al. | EP | 734758 A1 | 10/1996 |
| 2006/0273007 | A1 | 12/2006 | Zha et al. | EP | 763758 A1 | 3/1997 |
| 2006/0273038 | A1 | 12/2006 | Syed et al. | EP | 824956 A2 | 2/1998 |
| 2007/0007205 | A1 | 1/2007 | Johnson et al. | EP | 848194 A2 | 6/1998 |
| 2007/0007214 | A1 | 1/2007 | Zha et al. | EP | 855214 A1 | 7/1998 |
| 2007/0039888 | A1 | 2/2007 | Ginzburg et al. | EP | 627255 B1 | 1/1999 |
| 2007/0045183 | A1 | 3/2007 | Murphy | EP | 911073 A1 | 4/1999 |
| 2007/0051679 | A1 | 3/2007 | Adams et al. | EP | 920904 A2 | 6/1999 |
| 2007/0056904 | A1 | 3/2007 | Hogt et al. | EP | 1034835 A1 | 9/2000 |
| 2007/0056905 | A1 | 3/2007 | Beck et al. | EP | 1052012 A1 | 11/2000 |
| 2007/0075017 | A1 | 4/2007 | Kuzma | EP | 1349644 | 10/2003 |
| 2007/0075021 | A1 | 4/2007 | Johnson | EP | 1350555 A1 | 10/2003 |
| 2007/0084791 | A1 | 4/2007 | Jordan et al. | EP | 1236503 B1 | 8/2004 |
| 2007/0084795 | A1 | 4/2007 | Jordan | EP | 1445240 | 8/2004 |
| 2007/0108125 | A1 | 5/2007 | Cho et al. | EP | 1659171 A1 | 5/2006 |
| 2007/0138090 | A1 | 6/2007 | Jordan et al. | EP | 1420874 B1 | 1/2011 |

| | | | | | | |
|---|---|---|---|---|---|---|
| FR | 2620712 | 3/1989 | | JP | 04-310223 | 11/1992 |
| FR | 2674448 | 10/1992 | | JP | 04317793 | 11/1992 |
| FR | 2699424 | 6/1994 | | JP | 04334530 A | 11/1992 |
| FR | 2762834 A1 | 11/1998 | | JP | 04-348252 | 12/1992 |
| GB | 702911 | 1/1954 | | JP | 05-023557 | 2/1993 |
| GB | 2253572 A | 9/1992 | | JP | 05-096136 | 4/1993 |
| JP | 54-162684 | 12/1979 | | JP | 05-137977 | 6/1993 |
| JP | 55-129155 | 6/1980 | | JP | 05-157654 | 6/1993 |
| JP | 55-099703 | 7/1980 | | JP | 05161831 A | 6/1993 |
| JP | 55-129107 | 10/1980 | | JP | 05279447 A | 10/1993 |
| JP | 56-021604 | 2/1981 | | JP | 05-285348 | 11/1993 |
| JP | 56-118701 | 9/1981 | | JP | 05305221 A | 11/1993 |
| JP | 56-121685 | 9/1981 | | JP | 06-027215 A | 2/1994 |
| JP | 57190697 A | 11/1982 | | JP | 06-071120 | 3/1994 |
| JP | 58-088007 | 5/1983 | | JP | 06-114240 | 4/1994 |
| JP | 60-019002 | 1/1985 | | JP | 06170364 A | 6/1994 |
| JP | 60-206412 | 10/1985 | | JP | 06-218237 | 8/1994 |
| JP | 60260628 A | 12/1985 | | JP | 06-277469 | 10/1994 |
| JP | 61-097005 | 5/1986 | | JP | 06-285496 | 10/1994 |
| JP | 61-097006 | 5/1986 | | JP | 06-343837 | 12/1994 |
| JP | 61-107905 | 5/1986 | | JP | 07-000770 | 1/1995 |
| JP | 61-167406 | 7/1986 | | JP | 07-024272 | 1/1995 |
| JP | 61-167407 | 7/1986 | | JP | 07047247 A | 2/1995 |
| JP | 61-171504 | 8/1986 | | JP | 07-068139 | 3/1995 |
| JP | 61-192309 | 8/1986 | | JP | 07-136470 | 5/1995 |
| JP | 61-222510 | 10/1986 | | JP | 07-136471 | 5/1995 |
| JP | 61-242607 | 10/1986 | | JP | 07-155758 | 6/1995 |
| JP | 61-249505 | 11/1986 | | JP | 07155564 A | 6/1995 |
| JP | 61-257203 | 11/1986 | | JP | 7-39921 | 7/1995 |
| JP | 61-263605 | 11/1986 | | JP | 07-178323 | 7/1995 |
| JP | 61-291007 | 12/1986 | | JP | 07-185268 | 7/1995 |
| JP | 61-293504 | 12/1986 | | JP | 07-185271 | 7/1995 |
| JP | 62-004408 | 1/1987 | | JP | 07185270 A | 7/1995 |
| JP | 62068828 A | 3/1987 | | JP | 07185272 A | 7/1995 |
| JP | 62-114609 | 5/1987 | | JP | 07-236819 | 9/1995 |
| JP | 62-140607 | 6/1987 | | JP | 07-251043 | 10/1995 |
| JP | 62-144708 | 6/1987 | | JP | 07-256253 | 10/1995 |
| JP | 62-163708 | 7/1987 | | JP | 07-275665 | 10/1995 |
| JP | 62-179540 | 8/1987 | | JP | 07-289860 | 11/1995 |
| JP | 62-250908 | 10/1987 | | JP | 07-303895 | 11/1995 |
| JP | 62237908 A | 10/1987 | | JP | 07313973 A | 12/1995 |
| JP | 62187606 | 11/1987 | | JP | 08-010585 | 1/1996 |
| JP | 62262710 A | 11/1987 | | JP | 08323161 A | 12/1996 |
| JP | 63-097634 | 4/1988 | | JP | 08332357 A | 12/1996 |
| JP | 63099246 A | 4/1988 | | JP | 09000890 A | 1/1997 |
| JP | 63-143905 | 6/1988 | | JP | 09038470 A | 2/1997 |
| JP | 63-171607 | 7/1988 | | JP | 09072993 A | 3/1997 |
| JP | 63-180254 | 7/1988 | | JP | 09-099227 | 4/1997 |
| JP | S63-38884 | 10/1988 | | JP | 09-141063 | 6/1997 |
| JP | 64-075542 A | 3/1989 | | JP | 09155345 A | 6/1997 |
| JP | 1-501046 T | 4/1989 | | JP | 09-187628 | 7/1997 |
| JP | 01-151906 | 6/1989 | | JP | 09192458 A | 7/1997 |
| JP | 01-307409 | 12/1989 | | JP | 09-220569 | 8/1997 |
| JP | 02-017925 | 1/1990 | | JP | 09-271641 | 10/1997 |
| JP | 02-026625 | 1/1990 | | JP | 09-324067 | 12/1997 |
| JP | 02017924 | 1/1990 | | JP | 10024222 A | 1/1998 |
| JP | 02-031200 | 2/1990 | | JP | 10-033955 | 2/1998 |
| JP | 02040296 A | 2/1990 | | JP | 10-048466 | 2/1998 |
| JP | 02-107318 | 4/1990 | | JP | 10076144 A | 3/1998 |
| JP | 02-126922 | 5/1990 | | JP | 10076264 A | 3/1998 |
| JP | 02-144132 | 6/1990 | | JP | 10-085565 | 4/1998 |
| JP | 02-164423 | 6/1990 | | JP | 10085562 A | 4/1998 |
| JP | 02174918 A | 7/1990 | | JP | 10-156149 | 6/1998 |
| JP | 02241523 A | 9/1990 | | JP | 10180048 A | 7/1998 |
| JP | 02-277528 | 11/1990 | | JP | 10225685 A | 8/1998 |
| JP | 02-284035 | 11/1990 | | JP | 10235168 A | 9/1998 |
| JP | 03-018373 | 1/1991 | | JP | 10286441 A | 10/1998 |
| JP | 03-028797 | 2/1991 | | JP | 10328538 A | 12/1998 |
| JP | 03-086529 A | 4/1991 | | JP | 11005023 A | 1/1999 |
| JP | 03-110445 | 5/1991 | | JP | 11-028467 | 2/1999 |
| JP | 04108518 A | 4/1992 | | JP | 11033367 A | 2/1999 |
| JP | 04110023 A | 4/1992 | | JP | 11076769 A | 3/1999 |
| JP | 04-187224 | 7/1992 | | JP | 11-156166 | 6/1999 |
| JP | 4-190889 A | 7/1992 | | JP | 11-165200 | 6/1999 |
| JP | 04-250898 | 9/1992 | | JP | 11156360 A | 6/1999 |
| JP | 04-256424 | 9/1992 | | JP | 11-333265 | 7/1999 |
| JP | 4-256425 A | 9/1992 | | JP | 11-033365 | 9/1999 |
| JP | 04-265128 | 9/1992 | | JP | 11-319507 | 11/1999 |
| JP | 04-293527 | 10/1992 | | JP | 11302438 A | 11/1999 |

| | | |
|---|---|---|
| JP | 11319501 A | 11/1999 |
| JP | 2000000439 A | 1/2000 |
| JP | 2000051669 A | 2/2000 |
| JP | 2000061466 A | 2/2000 |
| JP | 2000-070684 | 3/2000 |
| JP | 200079390 A | 3/2000 |
| JP | 2000-093758 | 4/2000 |
| JP | 2000-185220 | 4/2000 |
| JP | 2000-157845 | 6/2000 |
| JP | 2000-157850 | 6/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000-317276 | 11/2000 |
| JP | 2001-009246 | 1/2001 |
| JP | 2001-070967 | 3/2001 |
| JP | 2001-079367 | 3/2001 |
| JP | 2001079366 A | 3/2001 |
| JP | 2001-104760 | 4/2001 |
| JP | 2001120963 A | 5/2001 |
| JP | 2001-190937 | 7/2001 |
| JP | 2001-190938 | 7/2001 |
| JP | 2001-205055 | 7/2001 |
| JP | 2001-510396 T | 7/2001 |
| JP | 2001179059 A | 7/2001 |
| JP | 2001179060 A | 7/2001 |
| JP | 2001-269546 | 10/2001 |
| JP | 2002177746 A | 6/2002 |
| JP | 3302992 B2 | 7/2002 |
| JP | 2002-527229 A | 8/2002 |
| JP | 2002525197 T | 8/2002 |
| JP | 2002263407 A | 9/2002 |
| JP | 2002-336663 | 11/2002 |
| JP | 2000-342932 | 12/2002 |
| JP | 2003024751 | 1/2003 |
| JP | 2003-047830 | 2/2003 |
| JP | 2003053160 A | 2/2003 |
| JP | 2003-062436 | 3/2003 |
| JP | 200371254 A | 3/2003 |
| JP | 2003-135935 | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004-008981 | 1/2004 |
| JP | 2004-230287 A | 8/2004 |
| JP | 2004230280 A | 8/2004 |
| JP | 2004337730 A | 12/2004 |
| JP | 2005144291 A | 6/2005 |
| JP | 2005154551 A | 6/2005 |
| JP | 2005279447 A | 10/2005 |
| JP | 2006-116495 | 5/2006 |
| JP | 2007-547083 | 8/2010 |
| KR | 2002-0090967 | 12/2002 |
| KR | 2003-033812 | 5/2003 |
| KR | 2003-060625 | 7/2003 |
| KR | 2005-063478 | 6/2005 |
| NL | 1020491 C | 10/2003 |
| NL | 1021197 C | 10/2003 |
| NZ | 510394 A | 5/2003 |
| NZ | 537874 A | 2/2007 |
| TW | 347343 | 12/1998 |
| WO | 8800494 A1 | 1/1988 |
| WO | 8801529 A1 | 3/1988 |
| WO | 8801895 A1 | 3/1988 |
| WO | WO 88-06200 | 8/1988 |
| WO | WO 89-00880 | 2/1989 |
| WO | WO 90-00434 | 1/1990 |
| WO | WO 91-04783 | 4/1991 |
| WO | WO 91-16124 | 10/1991 |
| WO | WO 93-02779 | 2/1993 |
| WO | WO 93-15827 | 8/1993 |
| WO | WO 93-23152 | 11/1993 |
| WO | WO 94-11094 | 5/1994 |
| WO | WO 95-34424 | 12/1995 |
| WO | 9603202 A1 | 2/1996 |
| WO | WO 96-07470 A1 | 3/1996 |
| WO | WO 96-28236 | 9/1996 |
| WO | WO 96-41676 | 12/1996 |
| WO | WO 1997-06880 | 2/1997 |
| WO | WO 98-22204 | 5/1998 |
| WO | WO 98-25694 | 6/1998 |
| WO | WO 98-28066 | 7/1998 |
| WO | WO 98-53902 | 12/1998 |
| WO | WO 99-01207 | 1/1999 |
| WO | 99-55448 A1 | 11/1999 |
| WO | WO 99-59707 | 11/1999 |
| WO | WO 00-18498 | 4/2000 |
| WO | WO 00-30742 | 6/2000 |
| WO | 0105715 A1 | 1/2001 |
| WO | WO 01-00307 | 1/2001 |
| WO | 0108790 A1 | 2/2001 |
| WO | 0119414 A1 | 3/2001 |
| WO | WO 01-32299 | 5/2001 |
| WO | WO 01-36075 | 5/2001 |
| WO | WO 01-45829 A1 | 6/2001 |
| WO | 0226363 A2 | 4/2002 |
| WO | 0230550 A1 | 4/2002 |
| WO | WO 02-40140 A1 | 5/2002 |
| WO | 0247800 A1 | 6/2002 |
| WO | WO 2003-000389 A2 | 1/2003 |
| WO | WO 2003-013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | WO 2004-101120 A1 | 11/2004 |
| WO | 2005005028 A1 | 1/2005 |
| WO | 2005028085 A1 | 3/2005 |
| WO | 2005028086 A1 | 3/2005 |
| WO | WO 2005-021140 A1 | 3/2005 |
| WO | WO 2005-037414 A1 | 4/2005 |
| WO | 2005046849 A1 | 5/2005 |
| WO | WO 2005-077499 A1 | 8/2005 |
| WO | 2005082498 A1 | 9/2005 |
| WO | 2005107929 A2 | 11/2005 |
| WO | 2006026814 A1 | 3/2006 |
| WO | 2006029465 | 3/2006 |
| WO | WO 2006-029456 A1 | 3/2006 |
| WO | 2006047814 A1 | 5/2006 |
| WO | 2007053528 A2 | 5/2007 |
| WO | 2007135087 A1 | 11/2007 |
| WO | 2008034570 A1 | 3/2008 |
| WO | 2008153818 A1 | 12/2008 |
| WO | 2009030405 A1 | 3/2009 |

OTHER PUBLICATIONS

Anonymous, "Nonwoven Constructions of Dyneon ™ THV and Dyneon ™ The Fluorothermoplastics", Research Disclosure Journal, Apr. 1999, RD 420013, 2 pages.

Cote et al., Wat. Sci. Tech. 38(4-5) (1998), pp. 437-442.

Cote, et al. "A New Immersed Membrane for Pretreatment to Reverse Osmosis" Desalination 139 (2001) 229-236.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCAROLIS et al., Membrane Technology Conference, "Optimization of Various MBR Systems for Water Reclamation" (2003).

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water.
Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Recent Advances in Microfiltration for Drinking Water Treatment; An Introduction to CMF-S, Presentation.
Kaiya et al., "Water Purification Using Hollow Fiber Microfiltration Membranes," 6th World Filtration Congress, Nagoya, 1993, pp. 813-816.
Lloyd D.R. et al. "Microporous Membrane Formation Via Thermally Induced Phase Separation-Solid-Liquid Phase Separation" Journal of Membrane Science, (Sep. 15, 1990), pp. 239-261, vol. 52, No. 3, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
MicroC™—Carbon Source for Wastewater Denitrification. Information from Environmental Operating Solutions website including MSDS.
Nakayama, "Introduction to Fluid Mechanics," Butterworth-Heinemann, Oxford, UK, 2000.
Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.
Rosenberger et al., Desalination, 151 (2002), pp. 195-200.
Ueda et al., "Effects of Aeration on Suction Pressure in a Submerged Membrane Bioreactor," Wat. Res. vol. 31, No. 3, 1997, pp. 489-494.
*Water Encyclopedia*, edited by Jay Lehr, published by John Wiley & Sons, Inc., Hoboken, New Jersey, 2005. Available at http://wwwminrw.interscience.wiley.com/eow/.
White et al., *The Chemical Engineering Journal*, 52 (1993), pp. 73-77.
Wikipedia, "Seawater," available at http://en.wikipedia.org/wiki/Seawater, Jul. 15, 2007.
Zenon, "Proposal for ZeeWeed®Membrane Filtration Equipment System for the City of Westminster, Colorado, Proposal No. 479-99," Mar. 2000, entire publication.
Mark et al., "Peroxides and Peroxy Compounds, Inorganic" Kirk—Othmer Encyclopedia of Chemical Technology, Peroxides and Peroxy Compounds, Inorganic, To Piping Systems, New York, Wiley & Sons, Ed., Jan. 1, 1978, pp. 14-18.
Webster's Ninth New Collegiate Dictionary, Merriam-Webster Inc., Publishers, Springfield, Massachusetts, USA, Copyright 1986, p. 1298.
Craig, Jones, "Applications of Hydrogen Peroxide and Derivatives," The Royal Society of Chemistry, Cambridge, UK 1999 Chapters 2 and 5.
Delgrange-Vincent, N. et al., Desalination 131 (2000) 353-362.
Kang et al. "Characteristics of microfiltration membranes in a membrane coupled sequencing batch reactor system" Water Research, Elsevier, Amsterdam, NL, vol. 37, No. 5, Mar. 2003.
U.S. Appl. No. 60/278,007, filed Mar. 23, 2001.
Yamamoto et al., Water Science Technology, vol. 2, pp., 43-54; 1989.
Yoon: "Important operational parameters of membrane bioreactor-sludge disintegration (MBR-SD) system for zero excess sludge production" Water Research, Elsevier, Amsterdam, NL, vol. 37, No. 8, Apr. 2003.
Canadian Office Action dated Sep. 22, 2010 for Application No. 2,488,895.

\* cited by examiner

METHODS OF MINIMISING THE EFFECT OF INTEGRITY LOSS IN HOLLOW FIBRE MEMBRANE MODULES

RELATED APPLICATIONS

This application is a continuation of U.S. patent application Ser. No. 11/496,378, filed on Jul. 31, 2006, entitled METHODS OF MINIMISING THE EFFECT OF INTEGRITY LOSS IN HOLLOW FIBRE MEMBRANE MODULES, now U.S. Pat. No. 7,344,645, which is a continuation of U.S. patent application Ser. No. 11/015,655, filed Dec. 16, 2004, entitled METHODS OF MINIMISING THE EFFECT OF INTEGRITY LOSS IN HOLLOW FIBRE MEMBRANE MODULES, which is now U.S. Pat. No. 7,160,463, which is a continuation of International Patent Application No. PCT/AU03/00755, filed on Jun. 17, 2003, under the Patent Cooperation Treaty (PCT), which was published by the International Bureau in English on Dec. 24, 2003, which designates the United States and which claims the benefit of Australian Provisional Patent Application No. PS 3006, filed Jun. 18, 2002.

FIELD OF THE INVENTION

The present invention relates to membrane filtration systems and in particular to system using a plurality of porous hollow fibre membranes wherein loss of membrane integrity can lead to degradation of filtration performance.

BACKGROUND OF THE INVENTION

Consider a typical hollow fibre membrane module as shown in FIG. 1. The module consists of plurality of hollow fibre membranes 5 potted at least at one end into a pot 6 having a length L. In order to calculate the flow from individual fibres the TMP (Transmembrane pressure $P_1$-$P_2$) is considered as acting across a total module resistance R to give a flow Q:

$$TMP/R \alpha Q \text{ (at constant temperature)}$$

Now in this typical model we can break the resistance down into:

$$R = R_m + R_{pot}$$

and $Q_i \alpha TMP/(R_m + R_{pot})$ where $Q_i$ is the flow emerging from the top of the intact fibre, $R_m$ is the module resistance and $R_{pot}$ is the resistance across the pot.

We can assume $R_m$ is constant—a sort of average—though it will vary down the length of the fibre.

Now taking the case where a fibre is broken at the top pot (a worst case for filtrate bypass). In this case:

$$R_m = 0$$

and $Q_b \alpha TMP/R_{pot}$ where $Q_b$ is the flow of filtrate emerging from the top of the broken fibre.

The ratio of the flow down a broken fibre to the flow down an intact fibre is calculated as follows:

$$= Q_b/Q_i = (R_m + R_{pot})/R_{pot}$$
$$= 1 + R_m/R_{pot}$$

In the normal case $R_m \gg R_{pot}$—typically 20. Thus it can be seen a broken fibre allows a significant amount of feed to contaminate the filtrate and thus degrade filtration performance. Additionally, increasing the internal diameter of the fibre makes the problem massively worse as typically $R_{pot} \alpha L/d^4$, where d is the diameter of the lumen and L is the length of the pot.

Accordingly, it is desirable to reduce the flow of filtrate from a broken fibre. Take the case where we increase $R_{pot}$ (for instance by increasing L or reducing d). The limit of $Q_b/Q_i$ tends to 1. This is a highly desirable result. But increasing the length of the pot is undesirable in other ways—it increases the length of the module and the expense of the module and process. The other option is to reducing the internal diameter of the fibre in the pot.

SUMMARY OF THE INVENTION

It is an object of the present invention to overcome or at least ameliorate the problems of the prior art associated with integrity loss in hollow fibre membrane filtration systems or at least provide a useful alternative.

According to one aspect, the present invention provides a method of reducing the effect of integrity loss in a hollow fibre membrane module, said module including a plurality of hollow fibre membranes, at least one end of said fibre membranes being supported in a pot, the method including the step of increasing flow resistance of the liquid through the lumen of the fibre membrane in the region of the pot.

Preferably, the step of increasing the flow resistance is produced by reducing the inner cross-sectional area of the fibre lumen in the region of the pot. For preference, the step of increasing the flow resistance is produced by placing a porous layer in the flow path of the fibre lumen in the region of the pot.

According to a second aspect, the present invention provides a hollow fibre membrane module including a plurality of hollow fibre membranes supported at least at one end in a pot and having flow restriction means in the lumens of said fibre membranes in the region of said pot.

Preferably, the flow restriction means comprise means for reducing the inner cross-sectional area of the fibre lumen in the region of the pot.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENT

Figure 1:
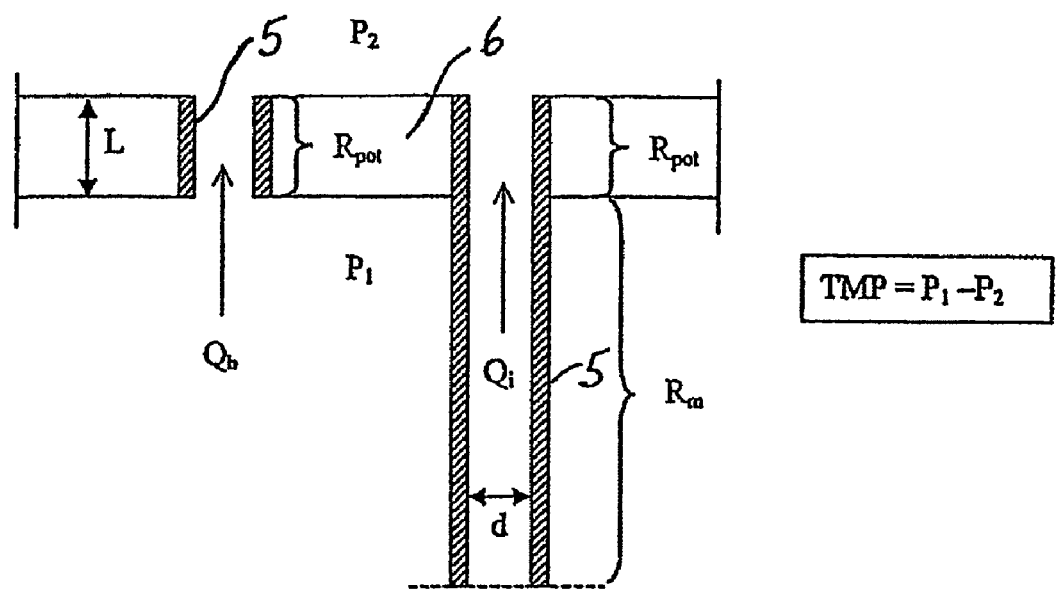
FIG. 1 is a schematic sectional elevation of a typical hollow fibre membrane module with an intact and broken fibre.
Figure 2:
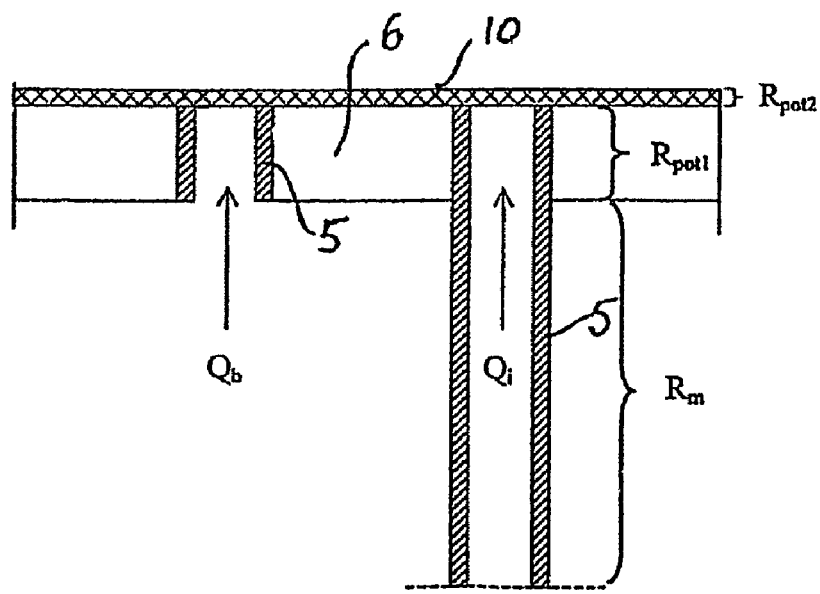
FIG. 2 is a similar view to FIG. 1 with the addition of a porous layer to the pot surface.

Referring to FIG. 2 of the drawings, one preferred embodiment of the invention is illustrated. A sinter or porous layer 10 is placed on top of the pot 6 to provide a further series resistance $R_{pot2}$ to the pot i.e.

$$R_{pot} = R_{pot1} + R_{pot2}$$

An appropriate sinter 10 may have openings of microns in dimension and only be a few millimeters thick. This method may reduce the $Q_b/Q_i$ by a factor of 10.

Such an arrangement provides added benefits when used for membrane filter systems in a bio-reactor. The high solids feed in bio reactors leads to the sludge actually plugging the filter and self sealing the broken fibre totally.

The may be extended to the general case by replacing the sinter with a membrane with the same pore size as the hollow fibre membrane and enabling achievement of this self plugging capability even with low solids feeds.

It will be apparent the extra resistance of the sinter or membrane 10 will require an extra pressure to maintain the module filtrate flow, however, this is only an operating cost not a membrane process operating efficiency as it is operating over the pot assembly, not across the compressible dirt layer on the membrane.

Fouling of this membrane sinter can be reduced by a regular chemical cleaning backwash with chlorine or other suitable cleaners.

The membrane/sinter 10 is desirably in intimate contact with the pot 6 to prevent sideways flow of filtrate/feed bypass. This may also be achieved with a replaceable sinter/membrane element.

A highly asymmetric membrane 10 with the large pore side contacting the pot 6 (so in normal filtrate flow the filtrate flows in the direction of reducing pore size) is desirable.

As shown in FIGS. 3B-3K a variety of methods may be used to increase the pot flow resistance.

Figure 3:
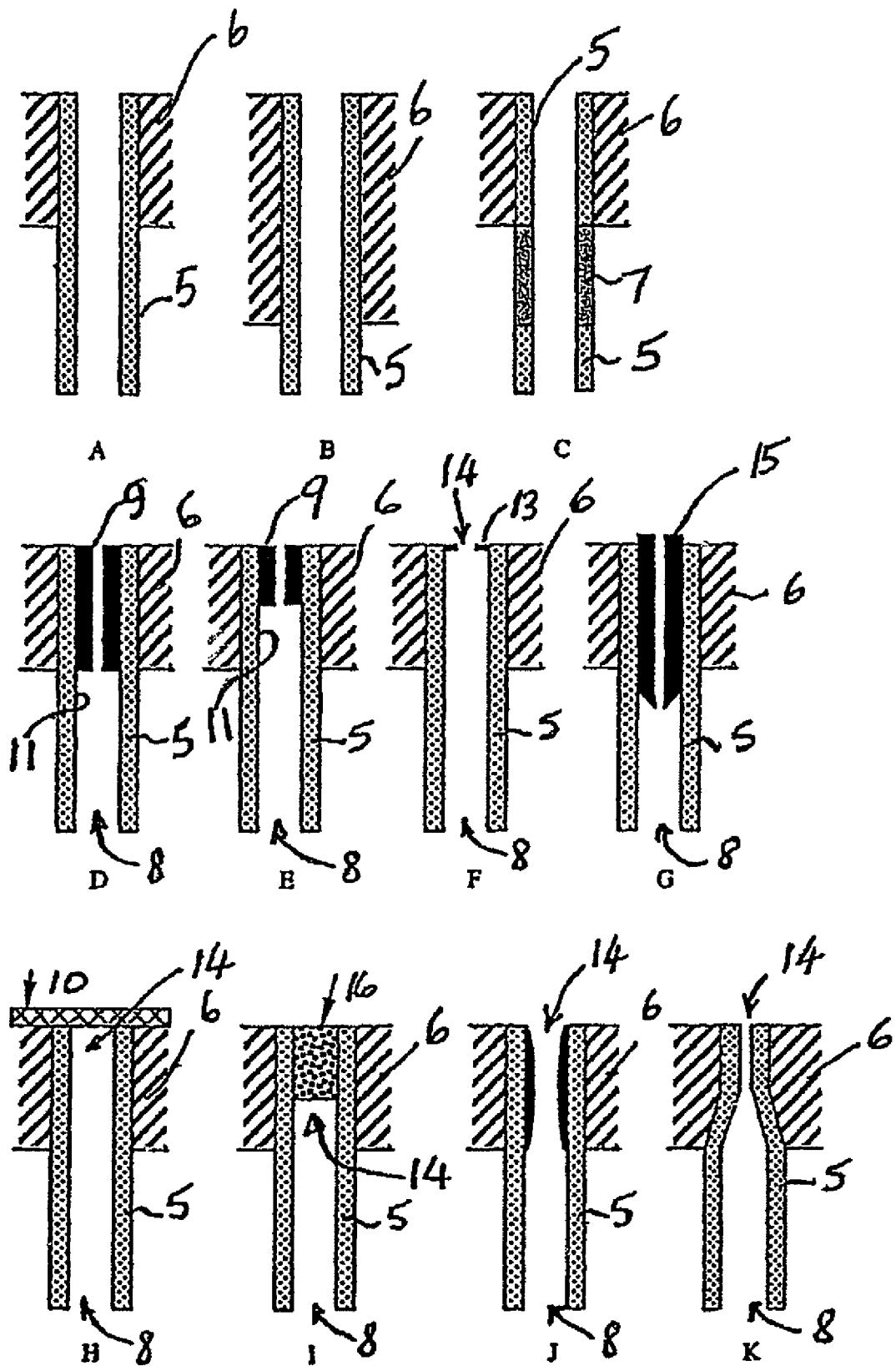
FIGS. 3A to 3K show enlarged schematic cross-sectional elevations of various embodiments of the invention.

Referring to FIG. 3A a normal pot 6 without modification is shown. FIG. 3B shows an increased length pot 6 which, while increasing pot flow resistance, has other disadvantages.

FIG. 3C illustrates providing the fibre 5 with a non porous coating 7 adjacent the interface 8 between the fibre 5 and the pot 6. This serves to increase pot flow resistance while also moving the fibre failure point away from the fibre-pot interface.

FIGS. 3D and 3E show a further method of reducing flow by reducing the inner diameter of the fibre lumen 8 using a layer of material 9 applied to part or whole of the inner surface 11 of the fibre lumen 8 in the region encompassed by the pot 6.

One method of providing such a layer 9 is to coat the inside of the lumen 8 near the end of the pot 6 with a thin layer of material that effectively reduces the diameter of the fibre lumen 8 at this point. This can be achieved by drawing up a material such as epoxy into the end of the fibre lumen 8 and then allowing it to run out again before it has time to set, leaving behind a thin coating 9 on the inner fibre lumen wall 12 that can then set over time.

The embodiment shown in FIG. 3F illustrates smearing the surface of the pot with a suitable grout material 13 to reduce the diameter of the fibre lumen 8 adjacent its opening 14 from the pot 6.

FIG. 3G shows the insertion of hollow annulus 15, for example, a hollow pin, into the end of the fibre lumen 8 in the region of the pot 6 to reduce the cross-sectional area of the lumen 8 in the region of the pot 6.

FIG. 3H shows the use of a porous layer of material 10 across the lumen opening 14 as also shown in the embodiment of FIG. 2.

FIG. 3I shows an embodiment where a porous material is forced into the lumen opening 14 to form a plug 16. This can be achieved by smearing a porous grout across and into the fibre lumen opening 14. Again this serves to reduce the flow resistance of the fibre lumen in the region of the pot 6.

FIG. 3J illustrates an embodiment of the invention where the fibre lumen 8 is narrowed within the region of the pot 6 by causing the potting material to swell or constricting the end of the fibre.

FIG. 3K shows an embodiment where the fibre lumen end is narrowed prior to potting.

Figure 4:
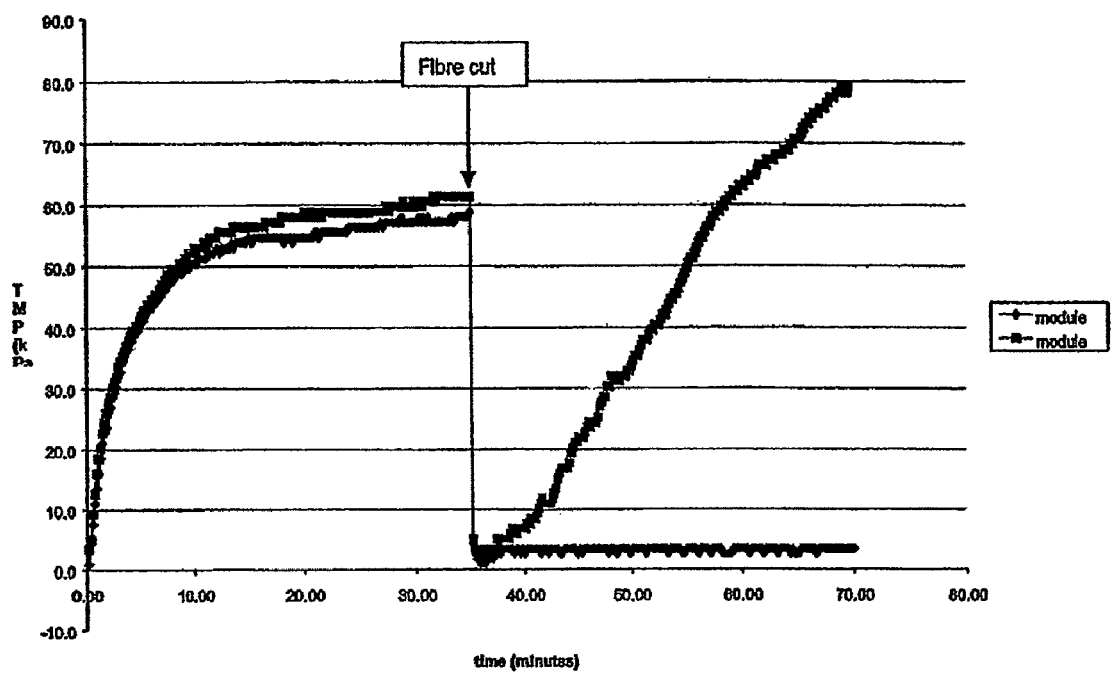
FIG. 4 shows the results of a test performed on two modules to illustrate the operation of the invention.

FIG. 4 shows the results of a test performed on two modules to illustrate the operation of the invention. Two modules A and B were used in the test. For each module one hollow fibre membrane was potted. The end of the fibre which was not in the pot, was sealed. A stainless steel mesh was glued on the top of one of the pots in a way that prevented sideways flow of feed bypass during filtration in a similar manner to the embodiments shown in FIGS. 2 and 3H. The mesh had openings of 51 microns and was 56 microns thick. The characteristics of both of the modules are shown in Table 1.

TABLE 1

Characteristics of the modules

| Name | Length of the pot $L_p$ (mm) | Length of the fibre $L_f$ (mm) | Other characteristics |
| --- | --- | --- | --- |
| Module A | 56 | 202 | none |
| Module B | 53 | 205 | Mesh glued on the pot |

Firstly, feed water was filtered through module A for 35 minutes. During this filtration, the transmembrane pressure (TMP) was measured. Then the fibre of module A was cut as close to the pot as possible and module A filtered the same feed water for a further 35 minutes. During this filtration, the transmembrane pressure (TMP) was measured. The same test was repeated with the module B using the same feed water.

The graph shown in FIG. 4 compares the TMP of the modules A and B during the two filtrations before and after the fibre was cut. The first part of the graph shows that the two curves are very similar. In particular, it shows that TMP of both modules increased at the same rate. Fibres of the modules were fouled at a similar rate. The small difference in TMP between the two modules is due to the mesh on module B which adds a small extra resistance to flow. The second part of the graph after the fibre of modules was cut shows that TMP of module A and B developed in a highly different way. The TMP of module A remained low and level whereas the TMP of module B increased sharply showing that the mesh was blocked by the feed contaminants.

This test clearly shows the efficiency of a mesh as far as reduction of integrity loss is concerned. Due to the addition of the mesh to the module, the cut fibre quickly sealed itself, preventing the feed from contaminating the filtrate.

It will be apparent to those skilled in the art that a wide variety and number of techniques can be used to reduce the flow within the fibre lumen in the region of the pot and that such techniques fall within the scope of the invention described. It will also be appreciated that further embodiments and exemplifications of the invention are possible without departing from the spirit or scope of the invention described.

What is claimed is:

1. A method of reducing an effect of integrity loss in a hollow fiber membrane module upon breakage of at least one membrane during filtration, the method comprising:
   supporting at least one end of a plurality of hollow fiber membranes, each comprising a lumen, in a membrane pot to form the hollow fiber membrane module; and
   inserting a hollow pin into the lumen of each hollow fiber membrane at a potted segment of each membrane lumen to provide an inner cross-sectional area of the potted segment of each membrane lumen that is smaller than an inner cross-sectional area of a remaining segment of each membrane lumen.

2. A hollow fiber membrane module, comprising:
   a plurality of hollow fiber membranes each comprising a lumen and each having at least one end supported in a pot; and
   a hollow pin inserted into the lumen of each one of the plurality of hollow fiber membranes in a region of the pot.

3. A filtration system, comprising:
   a hollow fiber membrane module, comprising:
      a plurality of hollow fiber membranes, each hollow fiber membrane comprising a lumen, wherein at least one end of each of the hollow fiber membranes is supported in a pot; and
      a hollow pin inserted into the lumen of each one of the plurality of hollow fiber membranes in a region of the pot to increase a flow resistance through the lumen of each of the hollow fiber membranes in the region of the pot; and
   a source of feed water fluidly connected to an inlet of the hollow fiber membrane module.

4. The system of claim 1, further comprising a sensor configured to monitor a transmembrane pressure level in the filtration system during filtration of the feed water.

\* \* \* \* \*